Nov. 12, 1968 L. W. BUECHLER 3,410,770
ELECTROLYTIC METHOD FOR PRODUCING OXYGEN AND HYDROGEN
Filed Feb. 18, 1966
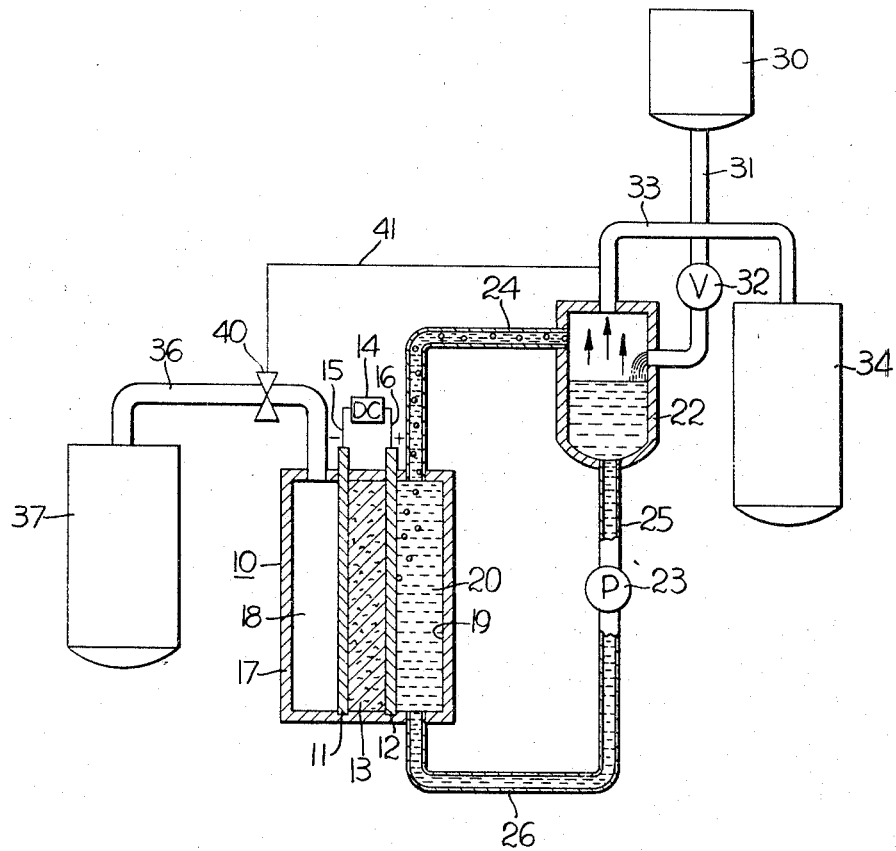
Inventor
Lester W. Buechler
By Paul Shapiro
Attorney United States Patent Office 3,410,770
Patented Nov. 12, 1968

3,410,770
ELECTROLYTIC METHOD FOR PRODUCING OXYGEN AND HYDROGEN
Lester W. Buechler, Elm Grove, Wis., assignor to Allis-Chalmers Manufacturing Company, Milwaukee, Wis.
Filed Feb. 18, 1966, Ser. No. 528,652
3 Claims. (Cl. 204—129)

ABSTRACT OF THE DISCLOSURE

A system for producing hydrogen and oxygen by the electrolysis of water in a bipolar cell, wherein oxygen is produced at one porous electrode and is collected in a gas chamber adjacent thereto and hydrogen is produced at the other porous electrode and is collected in the electrolyte chamber adjacent thereto. The electrolyte consumed from the electrolyte matrix between the electrodes is replaced by circulating fresh electrolyte through the electrolyte chamber causing it to diffuse through the hydrogen producing electrode. The hydrogen gas must be separated from the circulating electrolyte. Oxygen pressure is controlled within the gas chamber to maintain a pressure differential across the cell to prevent electrolyte from diffusing into the gas chamber.

---

This invention relates to improvements in process and apparatus for effecting electrolysis. More particularly, the present invention relates to an electrolytic cell apparatus for the production of oxygen and hydrogen from aqueous electrolyte solutions.

In the electrolysis of water for the production of hydrogen and oxygen, a direct current is passed through an aqueous electrolyte, usually a solution of caustic soda or caustic potash. Hydrogen is deposited at the cathode or negative electrode and oxygen at the anode or positive electrode. A particularly suitable electrolytic cell for the electrolysis of water is the bipolar or filter press type. This type of cell consists of a plurality of thin porous electrodes separated by a porous diaphragm, usually of asbestos, which separates the oxygen from the accompanying hydrogen produced at the electrodes. Electrolyte is continuously circulated to each of the electrodes to replenish the solution consumed by electrolysis and to maintain the electrolyte an optimum concentration, i.e., between about 15 to about 45 percent potassium or sodium hydroxide. The hydrogen and oxygen gas produced by the electrolytic cell move through the electrodes and escape freely from the back side of the electrodes and are evolved into the electrolyte solution and are thereafter disentrained from the circulating electrolyte solution by suitable separators.

Electrolytic cells of this type are highly advantageous as they are of a relatively compact structure and require less space for an equivalent productive capacity especially when compared to the tank type electrolytic cell.

A drawback in the use of the bipolar electrolysis cells just described is the requirement of dual systems for the supply of electrolyte to the electrodes of the cell, and the separation of gas from the electrolyte which add to the bulk and cost of the cells.

In accordance with the present invention, there is provided a bipolar electrolysis cell for the production of hydrogen and oxygen having a unitary circulatory and separation system for the cell electrolyte and gaseous product which comprises a pair of porous electrodes separated by and in contact with an electrolyte matrix saturated with an aqueous electrolyte. Aqueous electrolyte is circulated through an electrolyte chamber adjacent to a first porous electrode. Gas generated at the first electrode is evolved into the circulating electrolyte. Gas generated at the second electrode is evolved into an empty gas chamber adjacent to the electrode. In the electrolysis of water using this cell, the first electrode is preferably the anode, since the volume of oxygen produced at the anode is one-half that of the hydrogen produced at the cathode and consequently a smaller separator is required to disentrain the $O_2$ from the circulating electrolyte. Constant replenishment of electrolyte consumed by electrolysis at the second electrode is achieved by diffusion of fresh electrolyte from the electrolyte chamber through the porous first electrode. To prevent leakage of electrolyte through the porous second electrode, a pressure differential is maintained across the cell by regulating the pressure difference between the gas removed from the gas chamber adjacent to the second electrode and the gas removed from the circulating electrolyte.

The figure illustrates, in schematic cross section, one embodiment of a unit cell of the present invention.

Referring now to the accompanying figure, the cell 10 comprises a pair of gas permeable electrodes, cathode 11 and anode 12 in direct contact with the opposite surfaces of electrolyte matrix 13 saturated with an aqueous electrolyte and connected to a source of DC potential 14 by leads 15, 16. Electrolyte matrix 13 is a porous diaphragm of asbestos fibers or other material which is resistant to attack by caustic alkali solution or other electrolyte. The relative thickness of the electrodes 11, 12 and the matrix 13 as shown in the figure have been exaggerated for the purposes of clarity in the description. Actually in the preferred form, the electrodes and matrix may be but a few mils in thickness, the dimension not being critical. The electrodes 11 and 12 and electrolyte matrix 13 are supported in housing 17, which forms a gas chamber 18 with the cathode 11 and an electrolyte chamber 19 with the anode 12. Aqueous electrolyte 20 is contained in the electrolyte chamber 19.

The electrolyte matrix 13 saturated with the aqueous electrolyte serves a dual function. The matrix 13 maintains intimate contact between the interface of the electrolyte and the gas permeable electrodes 11 and 12 and also serves as a gas barrier to prevent mixing of the gas products.

Electrolyte is supplied to the cell by the circulation of electrolyte solution from separator 22 to electrolyte chamber 19 by means of pump 23 through lines 24, 25 and 26. The gas generated at the electrode 12 adjacent the electrolyte chamber 19 is removed from the electrolyte chamber entrained in the circulating electrolyte solution.

During the operation of the cell, the electrolyte solution 20 impelled by the driving force of the gas bubbles present in it is forced from the electrolyte chamber 19 through conduit means 24 and passed to electrolyte separator 22 wherein the gas produced at the electrode 12 and entrained in the electrolyte solution 20 is extracted and separated from the circulating electrolyte solution. Design details for the separators 22 are not shown, as separators of this nature are well known in the art. Water consumed by electrolysis is replaced by means of water storage means 30 from which water is fed in controlled amounts to separator 22 via conduit 31 to maintain the electrolyte at optimum concentration. Valve 32 regulates the addition of water to the electrolyte solution in separator 22 at a rate determined to replace the water consumed by electrolysis.

The gas produced at electrode 12 is withdrawn overhead from the separator via line 33 to storage means 34. The degassed electrolyte passes out of the separator 22 via conduit means 25 to pump 23 wherein it is directed via conduit means 26 back to the electrolyte chamber 19.

The gas generated at electrode 11 is evolved into gas chamber 18 and the chamber maintained under pressure by regulating the passage of gas out of the chamber. The gas that is removed from gas chamber 18 is passed by conduit 36 into storage means 37. When a DC electrode potential is initially applied to the apparatus at cathode 11 and anode 12, gas generated at the electrode 11 is collected in chamber 18 until the pressure of the gas in the chamber 18 exceeds the pressure of the gas generated at the electrode 12. This occurs in a relatively short time interval and if any electrolyte is present in chamber 18 it will be forced through the capillary matrix to chamber 19.

A differential pressure control valve means 40 on conduit 36 maintains a preset pressure differential between the gas pressure in gas chamber 18 and the pressure of the gas withdrawn from the separator 22 which is monitored to the valve 40 by the conduit 41. As the pressure of the gas produced at electrode 12 is raised or lowered, the valve 40 opens or closes in response to this pressure to provide an increase or decrease in the pressure of the gas in chamber 18 so as to maintain a constant differential pressure across the cell, and avoid leakage of electrolyte solution through the matrix 13 to chamber 18. A differential pressure across the cell of about 1/4 to 10 p.s.i. is sufficient and a differential pressure of about 1-2 p.s.i. is preferred. In this manner, the electrolyte in the electrolyte matrix 13 adjacent electrode 11 is constantly replenished with electrolyte solution. Since the gas produced at electrode 11 is not entrained in electrolyte, the need for a separator unit to disentrain gas from electrolyte is eliminated.

The electrodes used in the electrolysis cell of the present invention must be porous so that the gas products produced thereon may be removed therefrom and allow fresh electrolyte solution to diffuse through the electrolyte matrix. Preferably, the electrodes employed in the electrolysis cells of the present invention are sintered nickel electrodes having a porosity of about 80 percent. If desired, the electrodes and especially the porous electrode used for the generation of hydrogen may be catalyzed by a deposit on the electrode surface of platinum, iridium, palladium, rhodium and other metals chosen from Group VIII of the Periodic Table.

The electrolyte matrix is preferably a fibrous material having a high capillary potential higher than either electrode 11 or 12. Such fibrous material can be spun fibrous polypropylene, or asbestos, asbestos being the preferred fibrous material. After assembly, electrolyte matrix 13 is compressed against the electrodes 11, 12 in sealing engagement.

An electrolyte 20 is carried by electrolyte matrix 13. Suitable electrolytes include the aqueous solutions of inorganic acids such as sulfuric acid, or bases such as alkali hydroxides, and their salts.

Concentrations of electrolyte vary according to the specific electrolyte employed. Electrolyte solutions containing 15 to 45 percent by weight of an alkali hydroxide such as sodium or potassium hydroxide are preferred.

The electrolysis cells may be operated at temperatures ranging from 0° to 250° F. Operating temperatures of 140 to 180° F. are preferred when electrolyte solutions containing alkali hydroxides are employed.

The electrolysis cells may be operated at ambient or elevated pressures, but at whatever pressure employed, a pressure differential of about 1/4–10 p.s.i. must be maintained across the cell to prevent excess leakage of electrolyte through the porous electrode adjacent to the gas chamber.

As is obvious to one skilled in the art, a multicellular apparatus comprised of a plurality of the unit cells of the present invention may be connected in series and clamped into a compressed face-to-face relationship along a common axis to form a module or stack of cells. In commercial applications such assemblies are preferred for efficient, quantitative production of hydrogen and oxygen.

As an illustration of the invention, a 25 percent KOH solution was electrolyzed in a module comprised of 70 individual cells of the type illustrated in the figure to generate about 3.0 lbs./hr. oxygen and 0.38 lb./hr. hydrogen by impressing a DC voltage across the electrodes of the module utilizing a conventional DC power supply. Power was delivered at 65 amperes at 110 volts to the module. The cell electrodes were comprised of sintered porous nickel electrodes having a porosity of 80 percent and separated by and in contact with an asbestos matrix saturated with 25 percent KOH solution. The electrodes were of circular design and had a diameter of 7 5/8 inches and a thickness of 0.028 inch. The cell was operated at a temperature of 180° F. and a pressure of 300 p.s.i. A pressure differential of 1–2 p.s.i. was maintained across the cell. Oxygen gas was removed at the anode at ambient pressure from a 25 percent KOH solution which was circulated through the electrolyte chamber adjacent to the anode by the action of the evolving oxygen.

The embodiments of the invention in which an exclusive property or privilege is claimed are defined as follows:

I claim:

1. A method for producing hydrogen and oxygen by the electrolysis of water in a bipolar cell comprising a housing enclosing a first and second porous electrode spaced by an electrolyte matrix saturated with an aqueous electrolyte, a gas chamber defined between said first electrode and said housing, and an electrolyte chamber defined between said second electrode and said housing, the steps comprising:

applying a direct current electrical potential to said electrodes whereby the water in the electrolyte is dissociated to produce hydrogen gas at one electrode and oxygen gas at the other electrode, each of said gases diffusing through the respective electrodes to the respective chambers adjacent thereto;

maintaining the gas generated at the first electrode within said gas chamber at a sufficient pressure to prevent electrolyte from diffusing into said gas chamber;

exhausting and collecting excess gas from said gas chamber;

circulating fresh aqueous electrolyte through said electrolyte chamber causing a first portion of said fresh electrolyte to diffuse through the second electrode to replenish the aqueous electroltye consumed within the electrolyte matrix;

exhausting the second portion of said fresh electrolyte and the gas produced at said second electrode from said electrolyte chamber; and removing the gas from said second portion of fresh electrolyte.

2. The method for producing hydrogen and oxygen according to claim 1 wherein hydrogen is produced at said first electrode and oxygen is produced at said second electrode.

3. The method for producing hydrogen and oxygen according to claim 1 whereby the pressure maintained in said gas chamber is sufficient to provide a pressure differential across the cell of about 1–2 p.s.i.

References Cited

UNITED STATES PATENTS

| 1,588,214 | 6/1926 | Walsh | 204—129 |
| 3,017,338 | 1/1962 | Butler et al. | 204—129 |
| 3,057,794 | 10/1962 | Carlin | 204—252 |
| 3,313,718 | 4/1967 | Bloch | 204—129 XR |
| 3,316,163 | 4/1967 | Oser | 204—129 |

FOREIGN PATENTS 1,386,878  12/1964  France.

JOHN H. MACK, *Primary Examiner.*

D. ROBERT JORDAN, *Assistant Examiner.*